US011036750B2

(12) United States Patent
O'Brien et al.

(10) Patent No.: US 11,036,750 B2
(45) Date of Patent: Jun. 15, 2021

(54) DYNAMIC QUERY TOOL AND ASSOCIATED METHODS

(71) Applicant: Government of the United States, as Represented by the Secretary of the Air Force, Rome, NY (US)

(72) Inventors: Jeremy W. O'Brien, Sauquoit, NY (US); Kevin F. Palmowski, Syracuse, NY (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 268 days.

(21) Appl. No.: 15/968,907

(22) Filed: May 2, 2018

(65) Prior Publication Data

US 2019/0179947 A1    Jun. 13, 2019

Related U.S. Application Data

(60) Provisional application No. 62/596,938, filed on Dec. 11, 2017.

(51) Int. Cl.
*G06F 16/29* (2019.01)
*G06F 16/248* (2019.01)
(Continued)

(52) U.S. Cl.
CPC ........ *G06F 16/248* (2019.01); *G06F 16/2428* (2019.01); *G06F 16/2457* (2019.01); *G06F 16/24578* (2019.01); *G06F 16/29* (2019.01)

(58) Field of Classification Search
CPC .................................................. G06F 16/248
(Continued)

(56) References Cited

U.S. PATENT DOCUMENTS

| 7,734,755 B1* | 6/2010 | Bianco | H04L 41/0677 709/223 |
| 2012/0246105 A1* | 9/2012 | James | G16H 40/20 706/47 |

(Continued)

*Primary Examiner* — Eliyah S. Harper
(74) *Attorney, Agent, or Firm* — AFRL/RIJ; Randall P. Jones

(57) ABSTRACT

A multilayered search tool structured to search, retrieve and display information including a hierarchal query interface to be displayed on a user interface. The hierarchal query interface may include a required data search section, a plurality of weighted search blocks section, and an exclusionary search section. The multilayered search tool may also include a search result area structured to display a list of queried results, including textual data from a submitted query and a map configured to geographically display queried results. The required data search section may be structured to accept user input to specify subject matter that must be included in queried results. The plurality of weighted search blocks section may be structured to accept and weight input data and dynamically hone queried results. The exclusionary search section may be structured to accept user input to specify conditions that are to be excluded from the queried results. The required data search section, the plurality of weighted search blocks section, and the exclusionary search section may be structured to be used in tandem or separately. The textual data displayed within the search result area may be structured to be transformed into a search object after being selected by a user and placed within the hierarchal query interface.

17 Claims, 4 Drawing Sheets

(51) Int. Cl.
  *G06F 16/242*   (2019.01)
  *G06F 16/2457*  (2019.01)
(58) Field of Classification Search
  USPC .......................................................... 707/728
  See application file for complete search history.

(56) References Cited

U.S. PATENT DOCUMENTS

| | | | |
|---|---|---|---|
| 2014/0351000 A1* | 11/2014 | Tsai ................... | G06Q 30/0201 |
| | | | 705/7.29 |
| 2014/0372421 A1* | 12/2014 | Seacat DeLuca ... | G06F 3/04812 |
| | | | 707/724 |
| 2014/0378810 A1* | 12/2014 | Davis .................. | A61B 5/1034 |
| | | | 600/407 |
| 2015/0120703 A1* | 4/2015 | Sityon ............... | G06F 16/24564 |
| | | | 707/722 |
| 2018/0004751 A1* | 1/2018 | Vikhe ............... | G06F 16/24578 |
| 2018/0095967 A1* | 4/2018 | Kota ...................... | G06N 20/10 |

* cited by examiner

DYNAMIC QUERY TOOL AND ASSOCIATED METHODS

GOVERNMENT INTEREST

The invention described herein may be manufactured and used by or for the Government of the United States for all governmental purposes without the payment of any royalty.

FIELD OF THE INVENTION

The present invention relates to systems and methods for dynamically constructing and executing intuitive search queries structured to deliver relevant textual and visual search results.

BACKGROUND

Due to the expertise and effort required to craft complex queries on a large amount of data within a storage architecture, as well as the awkward input methods required, a query can quickly become difficult for an individual to enter and comprehend. Furthermore, associations and the relevance of results retrieved through these complex queries can become impossible to identify using a traditional static search method.

A user tasked with an analysis that requires highly complex conditional, temporal, and spatial search requirements over large amounts of data does not currently have a search method that operates in an intuitive manner for returning and discovering previously-unknown relevance and nuances. At first, an analyst may not be able to craft a meaningful query with confidence due to a lack of understanding regarding the underlying data set. This leads to repeated refinement of the query, which is time-consuming and wasteful without an effective method of honing query relevance. Therefore, there exists a need in the art for a visual search layout and method that allows for the entry of phrases, terms, and blocks within a dedicated area, where the significance of a query can be easily understood based on deliberate visual cues.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a multilayered search tool structured to search, retrieve and display information including a hierarchal query interface to be displayed on a user interface. The hierarchal query interface may include a required data search section, a plurality of weighted search blocks section, and an exclusionary search section. The multilayered search tool may also include a search result area structured to display a list of queried results, including textual data from a submitted query and a map configured to geographically display queried results. The required data search section may be structured to accept user input to specify subject matter that must be included in queried results. The plurality of weighted search blocks section may be structured to accept and weight input data and dynamically hone queried results. The exclusionary search section may be structured to accept user input to specify conditions that are to be excluded from the queried results. The required data search section, the plurality of weighted search blocks section, and the exclusionary search section may be structured to be used in tandem or separately. The textual data displayed within the search result area may be structured to be transformed into a search object after being selected by a user and placed within the hierarchal query interface.

In this embodiment logic operators may be applied to the hierarchal query interface's input data to formulate a single query. Furthermore, logic operators may be applied to a query based on input data's relative position within the hierarchal query interface. Also, the plurality of weighted search blocks section may use a combination of logical operators to weight and dynamically hone queried results.

The hierarchal query interface may be configured to dynamically perform logical operations on input data based on a preprogrammed set of rules. Furthermore, the queried results may be structured to be dynamically adjusted in real time as a user alters input data in the hierarchal query interface. Also, the hierarchal query interface may be displayed and configured to prompt a user to input data into search blocks based on a hierarchy of importance of search blocks.

In some embodiments the plurality of weighted search blocks section may include a plurality of weighted search blocks displayed from highest to lowest importance and ranked according to their vertical positioning along a longitudinal axis of the hierarchal query interface. Furthermore, any ungrouped individual terms within a search block may each get a weight associated with that block. Also, grouped terms within a search block may be coupled by an AND operator and the weight of each group may be calculated by dividing the weight of a block by the number of terms within the group.

A method of processing relevant search results through automated logic filtering and weighting may include prompting and receiving user input from a general query search section displayed on a user interface. It may also include prompting and receiving user input into a plurality of weighted search blocks section displayed on the user interface and prompting and receiving user input from an exclusionary search section displayed on the user interface. The method may dynamically perform logical operations on user-defined input data and may submit a query to a storage architecture. Furthermore, it may obtain and display queried results on the user interface in response to the submitted query. The user-defined input data may be weighted based on importance and the exclusionary search section may be structured to specify conditions that are to be excluded from queried results. The storage architecture may be remotely-hosted and accessed via a computer network connection and the queried results may be weighted and displayed based on relevance.

In this embodiment, the required data search section, the plurality of weighted search blocks section, and the exclusionary search section may be structured to be used in tandem or individually and the queried results may be displayed in at least one of textual data and visual representations on a map. Furthermore, textual data displayed within the search result area may be structured to transform into a search object after a user selects text from the search result area and places the selected text within the hierarchal query interface.

In some embodiments, the plurality of weighted search blocks section may include a plurality of weighted search blocks displayed and configured from highest to lowest importance and ranked according to their vertical positioning along a longitudinal axis of the hierarchal query interface. Furthermore, any ungrouped individual terms within a search block may each get a weight associated with that block and grouped terms within a search block may be coupled by an AND operator. The weight assigned to grouped terms may be calculated by dividing the weight assigned to the block by the number of individual terms within the respective group.

In some embodiments a method of performing computer query functionality may include displaying search blocks in a hierarchy of relevance on a user interface as well as prompting and receiving user input from a general query section, a plurality of weighted search blocks section, and an exclusionary search section. The method may include submitting a query from at least one of the general query search section, the plurality of weighted search blocks section, and the exclusionary search section to a storage architecture. It may also include weighting the query based on calculated importance placed on at least one search section from the plurality of weighted search blocks section and dynamically applying logical operators between each of the search blocks' input data to form a single query and returning results of submitted queries in real time relative to adjustments of search terms. Furthermore, the storage architecture may be structured to be remotely-hosted and accessed via a computer network connection.

In this embodiment, the results may be displayed in at least one of textual data and visual representations on a map and the results may be displayed in real time relative to adjustment of search terms. Furthermore, textual data displayed within the search result area may be structured to transform into a search object after a user selects text from the search result area and places the selected text within the hierarchal query interface.

In some embodiments, the plurality of search blocks section may be displayed and configured from highest to lowest importance and ranked according to a block's vertical positioning along a longitudinal axis of the hierarchal query interface. Furthermore, the plurality of weighted search blocks section may include at least five search blocks with diminishing weight relative to the respective search block's descending displayed order.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a search engine structured to dynamically construct and execute search queries and deliver textual and visual results that are both relevant and intuitive.

Figure 1:
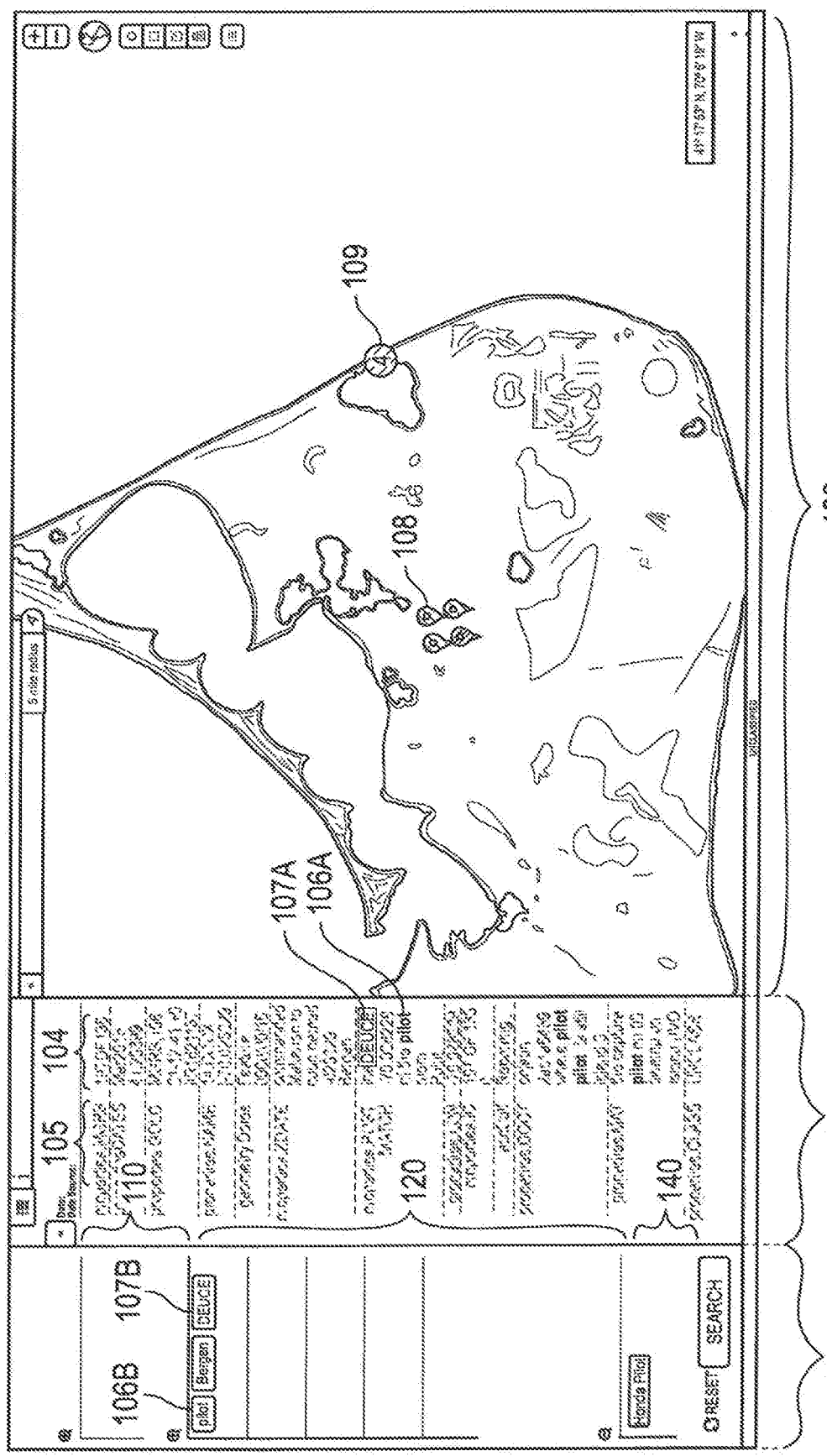
FIG. 1 is a planar view of a dynamic search engine according to an embodiment of the present invention.

FIG. 1 illustrates a dynamic search engine 100 that includes a hierarchal query interface 101, a search result area 102, and an interactive display map 103.

The hierarchal query interface 101 may be multilayered and may include a required data search section 110, a plurality of weighted search blocks section 120, and an exclusionary search section 140. The required data search section 110 may prompt a user to specify a subject matter that must be included in a queried result. Therefore, when a user enters information into the required data search section 110, that entered data may be displayed as either text in the search result area 102 or a visual geospatial result on the interactive display map 103, or both. In one embodiment, the required data search section 110 may appear at the top of the hierarchal query interface 101 relative to other search blocks.

The preferred embodiment of the hierarchal query interface 101 displays the required data search section 110 at the top, the plurality of weighted search blocks section 120 underneath, and the exclusionary search section 140 on the bottom. Although the preferred embodiment of the hierarchal query interface 101 is to display search blocks in a vertical orientation along a longitudinal axis, other orientations are contemplated to be within the scope of this application. One embodiment may include the hierarchal query interface 101 displayed in a horizontal orientation along a latitudinal axis whereby the required data search section 110 may appear to the far left as viewed by a user. In this embodiment the plurality of weighted search blocks section 120 may be positioned in the middle with the exclusionary search section 140 located to the far right. However, a person having ordinary skill in the art will appreciate that the hierarchy configuration may be adjusted from right to left, or vice versa, depending on user and programming preferences.

The plurality of weighted search blocks section 120 may be a group of search blocks along the hierarchal query interface's 101 longitudinal axis. The top-down positioning of the plurality of weighted search blocks section 120 may indicate the hierarchy of importance. In other words, data entered into a search block positioned above another search block may result in greater weight being given to data entered in the former over data entered in the latter. In one embodiment there may be five search blocks located within the plurality of weighted search blocks section 120. However, it is contemplated that more or fewer search blocks may be utilized depending on use and need.

In addition to the hierarchy being reflected in the structure and orientation of the plurality of weighted search blocks section 120, color may also reflect a hierarchy. By way of non-limiting example, the top search block of the plurality of weighted search blocks section 120 may be colored red and the bottom search block of the plurality of weighted search blocks section 120 may be colored blue. The search blocks between the top search block and the bottom search block may be a gradient of color between red and blue. In this embodiment, red may indicate the most important or most relevant input data and blue may indicate search data of lesser importance or relevance. The search blocks between solid red and solid blue may indicate their relative level of importance based on the amount of red or blue along with their physical positioning within the hierarchy.

The exclusionary search section 140 may prompt a user to specify a subject matter that must be excluded in a queried result. Therefore, when a user enters information into the exclusionary search section 140, that entered data will not be displayed as text in the search result area 102 and will not be displayed in the queried results. More specifically, the entire queried record that contains data from the exclusionary search section 140 may be excluded from returned queried results. Therefore, excluded records are left out of the chain of successive searches to better hone a user's search. In one embodiment, the exclusionary search section 140 may appear at the bottom of the hierarchal query interface 101 relative to other search blocks.

Located adjacent the hierarchal query interface 101 may be the search result area 102. The search result area 102 may display text that includes a title 105 in one column and a description 104 in another column. However, a person having ordinary skill in the art will appreciate that the title 105 may be displayed in the same column as the description 104. The text within the search result area 102 may be a textual representation of results returned from a dynamic search engine 100 query. The location of the search result area 102 proximate the hierarchal query interface 101 may facilitate interaction between the two.

Textual data from the search result area 102 may be highlighted by a user and transformed into a search object 107B. The highlighted text 107A may be transported from the search result area 102 to the hierarchal query interface 101 whereby the transported text 107A may serve as input data for the hierarchal query interface 101. Therefore, queried search results are able to be quickly honed by a user. A user can read through a description, pick out key words and promptly transport them as a search term without typing.

An additional feature of the search result area 102 includes creating an emphasized search object 106A within the queried results that has been entered into the hierarchal query interface 101 as a search term from a previous query. This assists a user to visually see how well their search terms are performing by quickly assessing the number of emphasized search objects 106A that appear in the search result area 102. In addition to search results being emphasized visually within the search result area 102, search results are also displayed visually on the interactive display map 103.

The interactive display map 103 may be operable to display search results relative to their geospatial origin. In other words, search results may be displayed overtop of the interactive display map 103 so that a user may visualize the geospatial information associated with the returned results. In one embodiment, search results displayed on the interactive display map 103 may be shown as a geographic point of interest 109. A geographic point of interest 109 may be a bounded area on the map where a significant portion of search results are located. If a user clicks on a geographic point of interest 109, a geographic cluster 108 may appear, indicating where and how many search results lie therein.

In other instances, the interactive display map 103 may display results as a matter of time and movement. For example, the interactive display map 103 may indicate several results along a linear path based on a timestamp accompanying the queried results. By way of non-limiting example, other results may not be linear, but may be represented as images, points, polygons, circles, and/or ellipses on the interactive display map 103. Each result on the interactive display map 103 may be selected by a user to display the corresponding queried result's data within the search result area 102. In any embodiment, queried results may be displayed on the interactive display map 103 and structured to be dynamically adjusted in real time as a user alters input data in the hierarchal query interface.

The data structure of the dynamic search engine 100 may consist of a user-facing front end, a data storage and querying infrastructure ("back end"), and an abstraction layer ("middleware") used to simplify communication between the front end and back end. The front end may be assembled from source code, such as JavaScript™, that may assemble a query by applying logic operators and weights to data entered in the search block. The front end may communicate this query to the back end via the middleware, which may then negotiate querying the back end infrastructure for matching data results. These results may be delivered to the middleware, which may perform additional processing before forwarding the results to the front end for appropriate display on a computer monitor or mobile display. However, it should be noted that this is one embodiment of querying results from a storage architecture using source code and a person skilled in the art may program the software in a different embodiment to achieve the same result. For example, one skilled in the art may exclude the middleware and only include a front end and a back end by allowing the front end to directly interface with the back end.

However, the preferred embodiment structure of the dynamic search engine 100 allows it to accommodate searching a large amount of data within a short period of time. Furthermore, the intuitive features and layout of the search engine allow a user to perform searches using deliberate visual cues and spatial placement to return relevant results on large amounts, or petabytes of data. By way of non-limiting example, searchable data may be entered into the searchable storage architecture from sensors such as heat and motion. Searchable data may also come from user-generated data, web content (text reports/publications/blogs/messaging, images, network data), overhead imagery, geographic location data, social media, Internet of Things (IoT) sensor data, and the like.

Searching this amount and type of data requires highly complex conditional, temporal, and spatial search requirements that must be executed in an intuitive manner to return and discover previously-unknown correlations and nuances within the data. Furthermore, when initially searching the data, an analyst may not be able to craft a specific query because that analyst may not be sure of the exact subject matter for which they are searching. The structure, layout and visual cues of the dynamic search engine 100 enhance the functionality of a normal computing system and allow a user to find that for which they are looking, in some instances without knowing that information in advance. Furthermore, the dynamic search engine 100 speeds up the searching process by taking a complex query and turning it into an easily usable visual prompt and a visual object.

Figure 2:
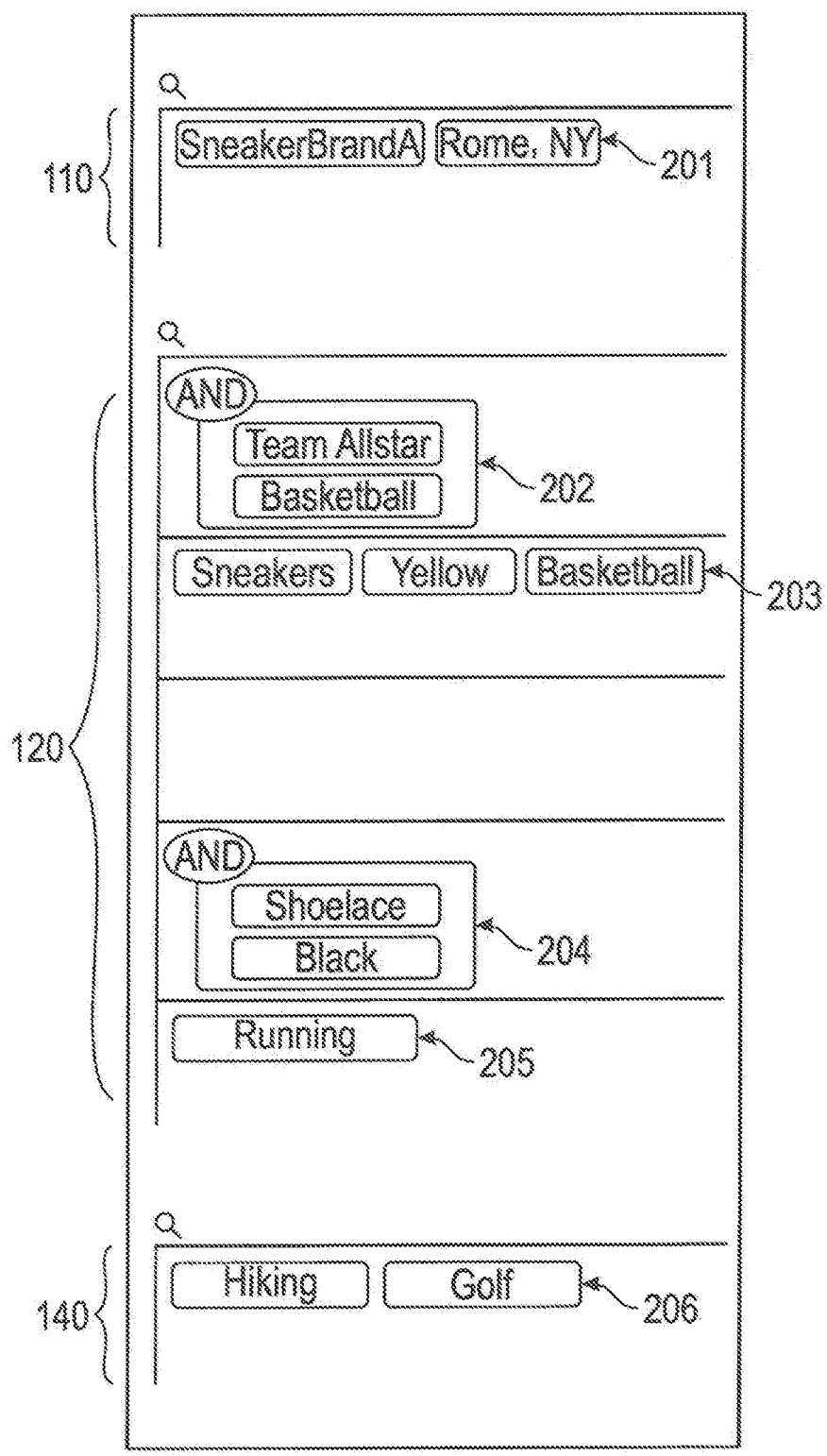
FIG. 2 is a planar view of the hierarchal search blocks illustrated in FIG. 1.

FIG. 2 illustrates one example of how the hierarchal query interface 101 may take entered data and automatically apply logic operators to form a complex query. In FIG. 2, several terms and phrases have been entered in the hierarchal query interface 101 search blocks. Some terms and phrases have been grouped, and some are listed individually. All three subareas of the hierarchal query interface 101, the required data search section 110, the plurality of weighted search blocks section 120, and the exclusionary search section 140, have been utilized. Simple search terms have been used for demonstrative purposes.

The required data search section 110 demands that "SneakerBrandA" AND "Rome NY" 201 must be present in a document for it to be returned as a result. The plurality of weighted search blocks section 120 illustrates the group of terms with the most relevance as being "team allstar" AND "basketball" 202. Other terms are entered in descending order of relevance, including "sneakers", "yellow", and "basketball" 203 in another search block. A group containing "Shoelace" AND "black" 204 is entered in another search block. "Running" 205 is in the final search block, indicating that while it is of interest, it has the least relevance or importance.

Unlike the required data search section 110, none of the data entered into the plurality of weighted search blocks section 120 need be present in a record for the record to be returned in a search result. However, if a term is present, the hierarchy applied by the plurality of weighted search blocks section 120 will place more weighting, or emphasis, on the queried results. This means that the respective term(s) may have a greater likelihood of being displayed higher on the list of returned results relative to the hierarchy.

The exclusionary search section 140 of FIG. 2 indicates "hiking" AND "golf," 206, which are two terms that will exclude any queried results from being retrieved if they contain those specific terms.

The resulting query that is applied by the dynamic search engine 100 from FIG. 2 is shown in Example 1 below:

Example 1

(SneakerBrandA AND "Rome NY") AND (("team allstar" AND basketball) OR sneaker OR yellow OR basketball OR (Shoelace AND black) OR running) AND NOT (hiking OR golf)

Using FIG. 2 and Example 1 as a reference, the user's search requires "SneakerBrandA" AND for those sneakers to be available in "Rome, NY". Preferably, they should be of type "team allstar" AND "basketball". If that requirement is too specific, or unavailable, then results may be returned for "basketball" "sneakers" of the color "yellow." Less important, but still relevant to the user's needs, are "black" AND "Shoelaces," and "running" type sneakers. Lastly, the exclusionary search section 140 dictates that under no circumstances is the user interested in results that mention "hiking" or "golf".

Without dynamic creation, the format of Example 1 is unintuitive and difficult to comprehend for most users. It is also difficult and time-consuming to enter. Furthermore, because of the specific order of operations required, misplacing or mistyping a parenthesis or logic operator will likely skew the results or lead to an invalid logical expression.

Hence, the dynamic search engine 100 allows a user to place the search terms in their respective search blocks and dynamically assembles and submits the query. Furthermore, and as previously mentioned, the ease of use is further increased because a search object 107A returned in the queried results may be created and dragged from the search result area 102 to the hierarchal query interface 101 to serve as input data for the hierarchal query interface 101. Likewise, the search objects 106B and transported search objects 107B may be dragged to different search blocks within the hierarchal query interface 101 to expedite honing a search.

Example 2 below, illustrates the search terms used in Example 1 with weighting applied. A person skilled in the art will appreciate that the numbers are representative only, and actual weighting may vary depending on programmer preference.

Example 2

(SneakerBrandA AND "Rome NY") AND (("team allstar" AND basketball)^2.5 OR sneakers^4 OR yellow^4 OR basketball^4 OR (shoelace AND black)^1 OR running^1) AND NOT (hiking OR golf)

As Example 2 demonstrates, the plurality of weighted search blocks section 120 may include a plurality of search blocks displayed and configured from highest to lowest importance and ranked according to their vertical positioning along a longitudinal axis of the hierarchal query interface. Any ungrouped individual terms within a search block each get a weight associated with that block. Furthermore, grouped terms within a search block are coupled by an AND operator and the weight of each term is calculated by dividing the total weight of a block by the number of terms within the block. Individual terms with an OR operator may be given the weight of the block itself. It should be noted that individual search terms may become grouped terms within a block if a user highlights a search term and moves it on top of another search term or terms. The newly formed grouped terms will be joined by an AND operator.

As illustrated by Example 2, weighting may be based on a scheme where each level within the plurality of weighted search blocks section 120 has integer-valued weight, such as, for example, with 1 being the lowest, and 5 being the highest. Group weighting may be applied such that a group on the top block (item 201 in FIG. 2) may have weight 5/2=2.5 since the top tier, in this example, is in a weight 5 section and contains 2 terms. The terms "sneakers," "yellow," and "basketball" (item 203 in FIG. 2) are individual terms separated by an "OR" clause one tier below the weight 5 tier. As a result, each term in this tier may be assigned a weight of "4." The "black" AND "shoelace" group (item 204 in FIG. 2) gets weight 2/2=1. Individual, non-grouped terms may get weight W/1=W, i.e., the weight from the level they're on. Accordingly, in a system where there are five tiers, the terms will be assigned a weight from 1-5. However, a system may be designed with more (or less) than five tiers, (e.g., 1-10), to account for a flexibility in weighing for more nuanced searches depending on the analysis and results desired.

The structural layout of the dynamic search engine 100 lends itself to user-friendly complex searches. The weighting algorithm incorporated by the dynamic search engine 100 allows for it to expedite the return of relevant results. The terms and weights included in a query are used by an information retrieval algorithm to assign an overall value to each record in an underlying storage architecture, and records with the highest such values are returned to the user.

The dynamic search engine 100 provides a means to alter query weighting in real-time in order to affect various visualizations of queried results. Through the use of a ranked list and a geospatial visualization, real-time visual feedback of search weighting provides the user with an intuitive overall view of the relevance of a query at any point during a search. With this visual feedback, a user can react and craft a more precise query that delves deeper into content that is most relevant to their needs.

The plurality of weighted search blocks section 120 utilizes an algorithm that improves how conventional searches are performed with grouped terms. For single terms, there is little ambiguity regarding the weight of the term because its vertical positioning indicates its weight. Applying weights to grouped or grouped terms is less straightforward. One method is to weight each term in a group with the weight assigned to a group. However, this causes grouped terms to be accounted for twice when weighted. As a result, the weighted scores of queried results that contain groups can be significantly different than results that do not, which can result in large "score gaps" in searched data rankings.

To avoid these scoring discrepancies, the weighting applied to groups by the dynamic search engine 100 may be adjusted. For example, let N be the number of terms inside of a particular group whose weights will be adjusted. It can be assumed that based on positioning within the plurality of weighted search blocks section 120 a group is applied weight W. A group's weighting is then calculated as W/N. Using this basic calculation to normalize weighting with queries using grouped terms and phrases ensures more intuitive result ranking order.

Another feature of the dynamic search engine 100 may grant a user the ability to identify a search term or phrase as a "field", or "key." A field in this context refers to the key of a key-value pair. For example, users typically fill in the value of a form or spreadsheet based on a request by the key. As another example, the column headings in a basic spreadsheet serve as keys that give context to the values entered in additional rows of the spreadsheet. This functionality is most useful when a user has a more specific search requirement. They may be interested in associating a search term, say "Rome, NY", with an "address" field in the underlying storage architecture.

Figure 3:
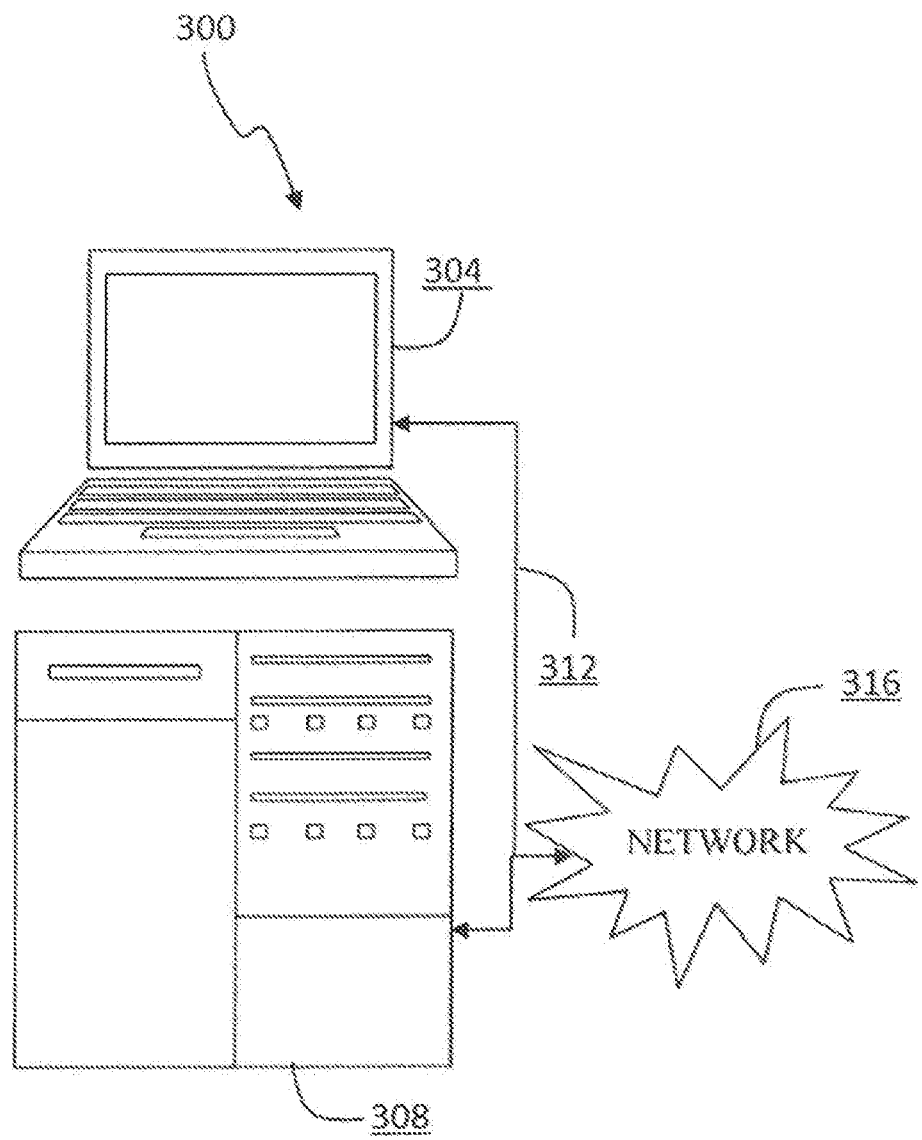
FIG. 3 is a schematic diagram of an exemplary computerized system according to an embodiment of the present invention.

The dynamic search engine 100 may be carried out in a single or a plurality of computerized systems working in tandem. It may be displayed on the monitor or screen of any desktop or mobile computing device and input may be managed by standard input devices known within the art. An illustrative example is shown in FIG. 3 and generally indicated as 300. Computerized system 300 that is shown in FIG. 3 may be considered to represent any type of computer, computer system, computing system, server, disk array, or programmable device such as multi-user computers, single-user computers, handheld devices, networked devices, or embedded devices, etc. For example, and without limitation, computerized system 300 is illustrated in FIG. 3 as comprising server, indicated as 308, and a personal computer, indicated generally as 304, which may be connected, as indicated by 312, through a network, indicated generally 316, to form a networked computer system using one or more networks.

Figure 4:
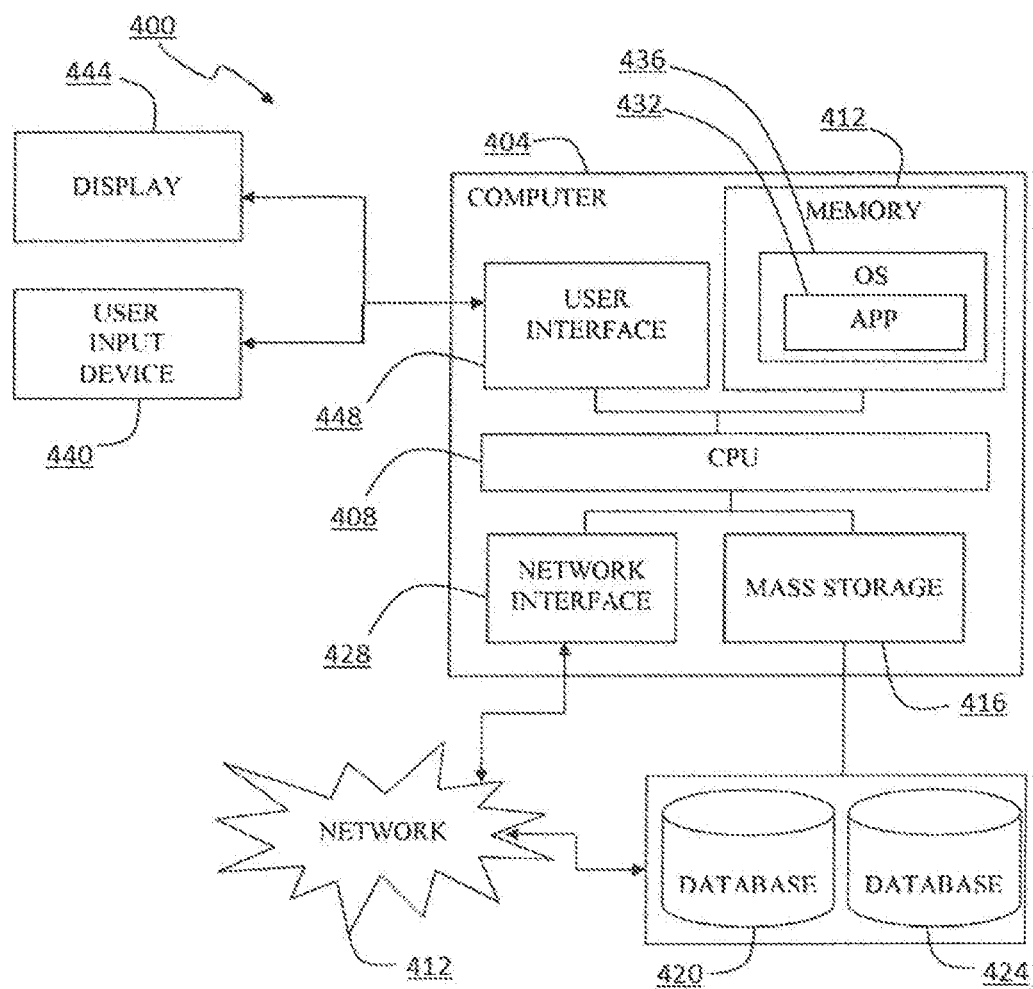
FIG. 4 is a schematic diagram of exemplary components of the computerized system of FIG. 3.

For example, and without limitation, computerized system 300 is represented schematically in FIG. 4 and is generally indicated as 400 that has a single computer, indicated as 404, although it should be appreciated that computerized system 400 may also include multiple suitable programmable electronic devices. Computer 404 typically may include at least one processing unit (illustrated as "CPU" 408) coupled to Memory 412 along with several different types of peripheral devices (e.g., a Mass Storage Device 416) with one or more storage architectures 420 and 424, an input/output interface 440, 444, and a Network Interface (I/F) 428. Memory 412 may include (not shown) dynamic random access memory ("DRAM"), static random access memory ("SRAM"), non-volatile random access memory ("NVRAM"), persistent memory, flash memory, at least one hard disk drive, and/or another digital storage medium. Mass storage device 416 is typically at least one hard disk drive and may be located externally to Computer 404, such as in a separate enclosure or in one or more networked computers, one or more networked storage devices (including, for example, a tape or optical drive), and/or one or more other networked devices (including, for example, a server).

CPU 408 may be, in various embodiments, a single-thread, multi-threaded, multi-core, and/or multi-element processing unit (not shown) as is known in the art. In alternative embodiments, Computer 404 may include a plurality of processing units that may include single-thread processing units, multi-threaded processing units, multi-core processing units, multi-element processing units, and/or combinations thereof as is known in the art. Similarly, Memory 412 may include one or more levels of data, instruction, and/or combination caches, with caches serving the individual processing unit or multiple processing units (not shown) as is well-known in the art.

Memory 412 of Computer 404 may include one or more applications (indicated schematically as "APP" 432), or other software program, which are configured to execute in combination with the Operating System (indicated schematically as "OS" 436) and automatically perform tasks necessary for processing and analyzing sequences with or without accessing further information or data from the storage architecture(s) of the mass storage device.

A user may interact with Computer 404 via a User Input Device 440 (such as a keyboard or mouse) and a Display 444 (such as a digital display) by way of a User Interface 448.

Those skilled in the art will recognize that the computerized system 300 and computer system 400 illustrated in FIGS. 3 and 4, respectively, are exemplary and may be in other configurations and may include other components. Indeed, those skilled in the art will recognize that other alternative hardware and/or software environments may be used in computerized system 300 and computer system 400.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A multilayered search tool configured to search, retrieve and display information, the multilayered search tool comprising:
    comprising a hierarchal query interface to be displayed on a user interface and a required data search section, a plurality of weighted search blocks section, and an exclusionary search section;
    a search result area configured to display a list of queried results, including textual data from a submitted query; and
    a map configured to geographically display queried results;
    wherein the required data search section is configured to accept user input to specify subject matter that must be included in queried results;
    wherein the plurality of weighted search blocks section is configured to accept and weight input data and dynamically hone queried results;
    wherein the exclusionary search section is configured to accept user input to specify conditions that are to be excluded from the queried results;
    wherein the required data search section, the plurality of weighted search blocks section, and the exclusionary search section are configured to be used in tandem or separately;
    wherein textual data displayed within the search result area is configured to be transformed into a search object after being selected by a user and placed within the hierarchal query interface; and wherein logic operators are applied to the hierarchal query interface's input data to formulate a single query.

2. The multilayered search tool according to claim 1 wherein the logic operators are applied to a query based on input data's relative position within the hierarchal query interface.

3. The multilayered search tool according to claim 1 wherein the plurality of weighted search blocks section uses a combination of logical operators to weight and dynamically hone queried results.

4. The multilayered search tool according to claim 1 wherein the hierarchal query interface is configured to dynamically perform logical operations on input data based on a preprogrammed set of rules.

5. The multilayered search tool according to claim 1 wherein the queried results are configured to be dynamically adjusted in real time as a user alters input data in the hierarchal query interface.

6. The multilayered search tool according to claim 1 wherein the hierarchal query interface is displayed and configured to prompt a user to input data into the plurality of weighted search blocks section based on a hierarchy of importance of search blocks.

7. The multilayered search tool according to claim 6 wherein the plurality of weighted search blocks section comprises a plurality of search blocks displayed and configured from highest to lowest importance and ranked according to their vertical positioning along a longitudinal axis of the hierarchal query interface; and
    wherein any ungrouped individual terms within a search block each get a weight associated with that block; and wherein grouped terms within a search block are coupled by an AND operator and the weight of each group is calculated by dividing the weight of the block by the number of terms within the group.

8. A method of processing relevant search results through automated logic filtering and weighting, the method comprising:
    prompting and receiving user input into a general query search section displayed on a user interface;
    prompting and receiving user input into a plurality of weighted search blocks section displayed on the user interface;
    prompting and receiving user input into an exclusionary search section displayed on the user interface;
    dynamically performing logical operations on user-defined input data, and submitting a query to a storage architecture; and
    obtaining and displaying queried results on the user interface in response to the submitted query;
    wherein the user-defined input data is weighted based on importance;
    wherein the exclusionary search section is configured to specify conditions that are to be excluded from queried results;
    wherein the storage architecture is remotely-hosted and accessed via a computer network connection; and wherein the queried results are weighted and displayed based on relevance; and
    wherein the required data search section, the plurality of weighted search blocks section, and the exclusionary search section are configured to be used in tandem or individually.

9. The method of processing relevant search results through automated logic filtering and weighting of claim 8 wherein the queried results are displayed in at least one of textual data and visual representations on a map.

10. The method of processing relevant search results through automated logic filtering and weighting of claim 8 wherein textual data displayed within the search result area is configured to transform into a search object after a user selects text from the search result area and places the selected text within the hierarchal query interface.

11. The method of processing relevant search results through automated logic filtering and weighting of claim 8 wherein the plurality of weighted search blocks section comprises a plurality of search blocks displayed and configured from highest to lowest importance and ranked according to their vertical positioning along a longitudinal axis of the hierarchal query interface.

12. The method of processing relevant search results through automated logic filtering and weighting of claim 11 wherein any ungrouped individual terms within a search block each get a weight associated with that block; and wherein grouped terms within a search block are coupled by an AND operator and the weight assigned to a grouped term is calculated by dividing the weight assigned to the block by the number of individual terms within the group.

13. A method of performing computer query functionality comprising:
    displaying search blocks in a hierarchy of relevance on a user interface;
    prompting and receiving user input from a general query search section, a plurality of weighted search blocks section, and an exclusionary search section;
    submitting a query from at least one of the general query search section, the plurality of weighted search blocks section, and the exclusionary search section to a storage architecture;
    weighting the query based on calculated importance placed on at least one search block from the plurality of weighted search blocks section;
    dynamically applying logical operators between each of the search blocks' input data to form a single query; and
    returning results of submitted queries in real time relative to adjustments of search terms;
    wherein the storage architecture is configured to be remotely-hosted and accessed via a computer network connection; and
    wherein the results are displayed in at least one of textual data and visual representations on a map.

14. The method of processing computer query functionally according to claim 13 wherein the results are displayed in real time relative to adjustment of search terms textual data and visual representations on a map.

15. The method of processing computer query functionality according to claim 13 wherein textual data displayed within the search result area is configured to transform into a search object after a user selects text from the search result area and places the selected text within the hierarchal query interface.

16. The method of processing computer query functionality according to claim 13 wherein the plurality of weighted search blocks section is displayed and configured from highest to lowest importance and is ranked according to a block's vertical positioning along a longitudinal axis of the hierarchal query interface.

17. The method of processing computer query functionality according to claim 13 wherein the plurality of weighted search blocks section includes at least five search blocks with diminishing weight relative to the respective search block's descending displayed order.

* * * * *